Figure 1:
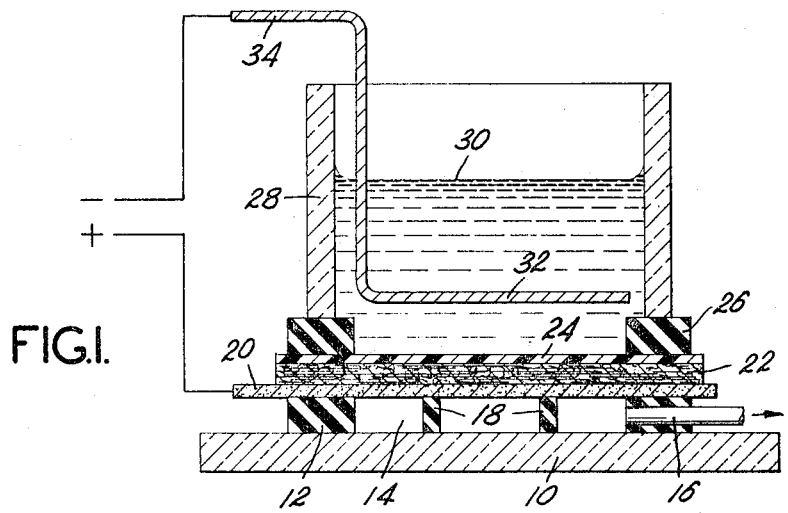
Figure 2:
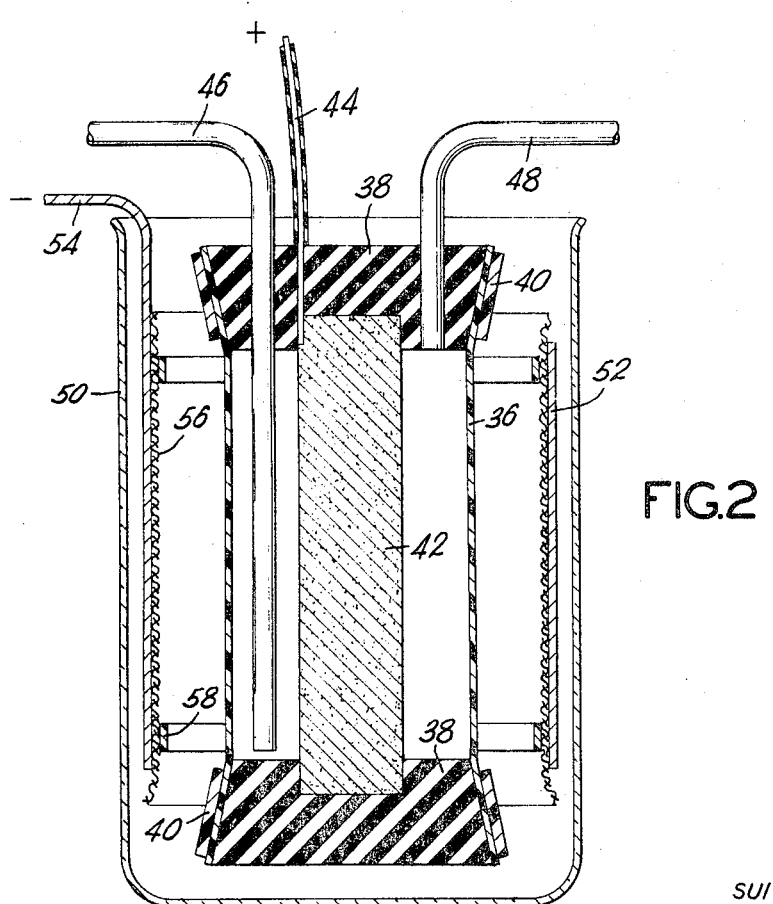

INVENTORS
SUI-WU CHOW
RODWIN E. GULICK
FREDERICK W. ORTTUNG JR
BY Bernard F. Crowe
ATTORNEY

United States Patent Office 3,445,362
Patented May 20, 1969

3,445,362
ELECTRODEPOSITED OLEFIN INTERPOLYMERS AND METHODS FOR MAKING SAME
Sui-Wu Chow and Rodwin E. Gulick, Somerville, and Frederick W. Orttung, Jr., Middlesex, N.J., assignors to Union Carbide Corporation, a corporation of New York
Continuation-in-part of application Ser. No. 431,716, Feb. 10, 1965. This application June 30, 1966, Ser. No. 561,877
Int. Cl. C23c *13/02*
U.S. Cl. 204—181        27 Claims This application is a continuation in part of application Ser. No. 431,716, filed Feb. 10, 1965 and now abandoned.

This invention relates to polymers of α-olefins and more particularly to carboxyl containing α-olefin polymers and to their deposition onto substrates by electrolytic means.

Many varieties of polymeric substances have been used to coat myriad substrates by such well known techniques as dipping, spraying, painting and the like as well as by electrodeposition techniques including electrolysis, electrophoresis and electroendosmosis and by electrostatically depositing liquid coatings from the air. The coagulation of rubber latex by electrodeposition was studied more than 30 years ago. In these processes the coating operation provides a mechanical means for conveying the coating substance to the article to be coated without chemically changing the coating substance. The only change in state is from a bulk quantity to a relatively thin coating layer. A simpler example of a method is the application of paint to a metal panel from a bucket with a brush. Not until the paint has "dried" is there a qualitative change effected. It is highly desirable to be able to apply a uniform, continuous film of coating material of a predetermined thickness from solution onto a substrate, which material upon contacting with the substrate changes physically and/or chemically so that the reverse process, viz., washing or rubbing off does not take place.

It is, therefore, an object of this invention to provide a process suitable for coating various substrates.

It is also an object to provide a process which is rapid and not cumbersome in operation.

It is a further object to provide highly permeable membranes of carboxyl containing α-olefin polymers as well as electrolytic methods of preparing same.

Other objects will become apparent to those skilled in the art upon examination of the description of the invention hereinafter.

These objects have been achieved by electrodepositing a carboxyl containing α-olefin polymer onto a conductive anodic substrate from an aqueous bath containing an admixture of water and a carboxyl containing α-olefin polymer salt having monovalent cations.

Quite surprisingly it has been found that continuous, insulating coatings of such polymers are easily deposited onto conductive anodic substrates by the application of only very low potentials, i.e., about 5 volts D.C. or more, from a coating bath comprising a solution or dispersion in water of an α-olefin polymer containing pendant carboxylic acid salt groups. These salts can be either water soluble or water dispersible at least to the point that finely divided suspensions can be secured. The concentration of polymer salt in the aqueous bath is not narrowly critical and can in fact range from about 5 to 40 weight percent or more if desired. Firmly adhering films can be evenly deposited onto the anodic substrate regardless of its configuration even with baths having as little as 2–5 weight percent of the interpolymer salt distributed therein.

Steps involved in one method of practicing this invention include:

(a) Immersing the anodic substrate in a bath comprising in admixture water and a carboxyl containing α-olefin polymer salt having monovalent cations;

(b) Connecting a cathode in electrical contact with said water-salt bath;

(c) Connecting a direct current source in an electrical circuit containing the anodic substrate, cathode, and water-salt bath; and (d) Applying a voltage of at least about 5 volts D.C. for a length of time sufficient to effect the deposition on the anodic substrate of a continuous, insulating coating of a partially modified α-olefin-carboxyl containing polymer, said polymer containing less carboxyl anions than the α-olefin carboxyl containing polymer salt present in the water-salt bath.

While not essential, the coated anodic substrate is preferably rinsed in water to remove occluded bath fluid. This can readily be done without danger of washing off any of the electrodeposited coating because the latter having been chemically changed by the electrodeposition process is not removable by water. It is also preferred, although not critical that the coated anodic substrate be dried at elevated temperatures by any conventional drying apparatus such as forced draft or convection oven, heating lamp, hot air gun and the like. Drying temperatures up to about 120° C. are preferred, although higher temperatures as well as lower temperatures can be used, if desired.

Although not essential, it is preferred to employ as the carboxyl containing α-olefin polymer of this invention interpolymers of α-olefins having the general formula:

$$R-CH=CH_2$$

where R is selected from the group consisting of hydrogen and alkyl radicals having up to 10 carbon atoms, the olefin content of said interpolymer being at least 50 mole percent of the total interpolymer and interpolymerized therewith an α,β-ethylenically unsaturated carboxylic acid having up to 2 carboxylic acid groups, said unsaturated carboxylic acid constituting up to about 25 mole percent of the total interpolymer.

However, the present invention is not limited to interpolymers derived from the interpolymerization of an α-olefin and an α,β-ethylenically unsaturated carboxylic acid. The starting polymer used to make the monovalent polymer salts used in this invention can also be provided by oxidizing olefinic polymers, such as those described in U.S. 3,155,644, by grafting carboxyl containing monomers onto an olefin polymer backbone by methods well known in the graft polymerization art, such as those described in U.S. 2,970,129, all of which are incorporated herein by reference or by grafting monomers such as carboxylic acid derivatives, i.e., esters, anhydrides, amides, nitriles and the like onto an olefin polymer backbone followed by conversion to free carboxylic acid groups after grafting.

Also included within the purview of this invention are halogenated, carboxyl containing α-olefin polymers. The method of introducing the halogen into these polymers is not at all critical and so can be accomplished by first preparing a halogen free interpolymer of, for example, ethylene-acrylic acid and then halogenating that interpolymer by methods well known in the art or by interpolymerizing a halogen containing vinyl monomer with an α-olefin and an unsaturated carboxylic acid. A specific example of this latter class of interpolymers is one obtained by interpolymerizing ethylene, vinyl chloride and acrylic acid. Other examples include interpolymers of ethylene-vinylidene chloride-acrylic acid, ethylene-vinyl chloride-methacrylic acid, ethylene-vinylidene chloride-methyacrylic acid, ethylene-vinyl bromide-acrylic acid, ethylene-vinyl bromide-methacrylic acid, ethylene-vinyl fluoride-acrylic acid, ethylene-vinyl fluoride-methacrylic acid, ethylene-vinylidene fluoride-acrylic acid, ethylene-vinylidene fluoride - methacrylic acid, ethylene - vinyl iodide-acrylic acid, propylene-vinyl chloride-acrylic acid, propylene-vinyl chloride-methacrylic acid, propylene-vinylidene chloride-acrylic acid, propylene-vinylidene chloride-methacrylic acid and the like and mixtures thereof.

As indicated above, the α-olefins preferably employed in the interpolymers of this invention are α-olefins having the general formula:

$$RCH=CH_2$$

where R is either a hydrogen or an alkyl radical having up to 10 carbon atoms. Thus, suitable α-olefins include: ethylene, propylene, butene-1, pentene-1, hexene-1, neohexene, octene-1, nonene-1, decene-1, 3-methylbutene-1, 4-methylpentene-1, 3-methylhexene-1, 4,4-dimethylhexene-1 and the like. Although polymers of higher olefins can be used, they are not as commercially available or economical as the lower olefins.

The α,β-ethylenically unsaturated carboxylic acids used in the interpolymers of this invention preferably have 3 to 8 carbon atoms, although those having a greater number of carbon atoms can also be used, if desired. Specific examples include: acrylic acid, methacrylic acid, ethacrylic acid, itaconic acid, maleic acid, fumaric acid, and half esters of the above dicarboxylic acids such as, methyl hydrogen maleate, methyl hydrogen fumarate, ethyl hydrogen maleate, ethyl hydrogen fumarate and the like.

The starting polymers used to make the salts of this invention are not limited to two components. Therefore, additional copolymerizable monomers can be employed together with the olefin and carboxylic acid comonomers. The scope of the starting interpolymers which can be used is exemplified, although not limited by the following interpolymers: ethylene/acrylic acid interpolymers, ethylene methacrylic acid interpolymers, ethylene/itaconic acid interpolymers, ethylene/methyl hydrogen maleate interpolymers, ethylene/maleic acid interpolymers, ethylene/acrylic acid/methyl acrylate interpolymers, ethylene/acrylic acid/ethyl acrylate interpolymers, ethylene/methacrylic acid/methyl methacrylate interpolymers, ethylene/methacrylic acid/ethyl methacrylate interpolymers, ethylene/acrylic acid/methacrylic acid interpolymers, ethylene/methacrylic acid/methyl acrylate interpolymers, ethylene/acrylic acid/methyl methacrylate interpolymers, ethylene/methyl hydrogen maleate/ethyl acrylate interpolymers, ethylene/acrylic acid/vinyl acetate, ethylene/methacrylic acid/vinyl acetate interpolymers, ethylene/propylene/acrylic acid interpolymers, ethylene/propylene/methacrylic acid interpolymers, ethylene/maleic acid/ethyl vinyl ether interpolymers, ethylene/butene-1/acrylic acid interpolymers, ethylene/neohexene/acrylic acid interpolymers, propylene/acrylic acid interpolymers, butene-1/acrylic acid interpolymers and the like.

The carboxyl content of the starting olefin polymer is preferably in the range of about 5 to 25 mole percent of the total polymer although contents of about 1 to 25 mole percent can also be employed, if desired. The starting olefin polymer used to make the polymer salts in this invention should contain sufficient carboxyl groups to permit the formation of at least water-dispersible salts and preferably water-soluble salts. Solubility increases as the carboxylic acid salt moiety content of the polymer is increased. The upper limit of carboxylic acid salt moiety content will depend broadly on the end use to which the electrodeposited interpolymer is to be put and specifically on the physical and chemical properties related to that end use. For example, flexibility, hardness, elongation or impact strength might be the prime requisites where the electrodeposited interpolymer is to be used as a protective coating for metal parts. For laminations, elongation, adhesion and peel strength might be the most sought for properties. For the particularly preferred starting interpolymer compositions, viz, ethylene/acrylic acid or ethylene/methacrylic acid interpolymers, the preferred range of acrylic acid or methacrylic acid interpolymerized in these olefin interpolymers lies between about 4 and 25 mole percent of the total interpolymer. For most purposes the melt index of these starting interpolymers used to make interpolymer salts should be in the range of about 0.1 dg./min. to 1000 dg./min.

The polymer salts used in this invention need not be limited to 2 components, i.e., one α-olefin and one carboxylic acid salt moiety, ether. Even when the starting polymer is composed of only 2 components, viz, one α-olefin and one carboxylic acid, the resultant salt can have 3 or more components. To cite a concrete case in point, an ethylene/acrylic acid interpolymer can be partly neutralized with sodium hydroxide to afford an interpolymer salt consisting of 3 components, viz, ethylene, acrylic acid, and sodium acrylate mers. It will be readily apparent to those skilled in the art that interpolymer salts containing innumerable combinations of α-olefins and unsaturated carboxylic acids, salts and acid derivatives are contemplated within the purview of this invention.

The carboxyl salt moiety content of the olefin polymer salts is preferably about 3 to 25 mole percent of the total polymer salt although other ranges can also be employed, if desired. The term "carboxyl salt moiety" includes both the carboxyl anion and the monovalent cation.

The preferred monovalent cations in the polymer salts of this invention are Na+, K+, Li+ and

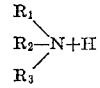

wherein each of $R_1$, $R_2$ and $R_3$ is hydrogen or an organic radical, containing up to 10 carbon atoms, which is unsubstituted or substituted with a hydrophilic group such as hydroxyl, amino, imino or cyclic ether groups and wherein two of the organic radicals when taken together form a heterocyclic compound.

The organic radical can be a hydrocarbon radical such as an alkyl, cycloalkyl, aryl, alkaryl or aralkyl radical. Suitable alkyl radicals include methyl, ethyl and isopropyl radicals. Representative cycloalkyl radicals include cyclobutyl, cyclopentyl and cyclohexyl radicals. Representative aryl radicals include phenyl and naphthyl radicals. Among the alkaryl and aralkyl radicals which can be used are benzyl, cumyl, tolyl and xylyl radicals.

Representative monovalent cations incorporating substituted hydrocarbon radicals include those derived from: ethanolamine, diethanolamine, triethanolamine, ethylene diamine, diethylene triamine, triethylenetetramine, dimethylamino propylamine, N-(hydroxyethyl)ethylene diamine, N-(2-hydroxypropyl)ethylene diamine and the like.

Representative heterocyclic compounds include piperazine, 2,5-dimethyl piperazine, piperidine, morpholine and the like.

These polymer carboxyl salts can be prepared by neutralizing the starting carboxyl containing polymer with metal salts, such as carbonates or bicarbonates, metal bases such as hydroxides or alkoxides, amine bases such as trimethyl ammonium hydroxide, monomethyltriethyl ammonium hydroxide, dimethylphenyl ammonium hydroxide and the like, aliphatic amines such as ethanolamine, ethylene diamine, N-(hydroxyethyl)ethylene diamine and the like, cyclic amines such as piperazine, pyridine, piperidine, morpholine and the like, metal alkyls such as sodium ethyl, butyl lithium and the like, metal aryls such as phenyl lithium, potassium naphthalene and the like, hydrides of sodium, potassium or lithium, amides of sodium or potassium, oxides such as sodium peroxide or in the case of alkali metal salts even with the free alkali metal itself. Preferred bases are alkyl ammonium hydroxides, ammonium hydroxide, lithium hydroxide, sodium hydroxide and potassium hydroxide. Any method known in the art can be used to effect this neutralization process.

Where thin coatings of less than 5 microns of electrodeposited polymers are desired, it is preferred to use carboxyl-containing olefin polymer salts having inorganic monovalent cations such as $Na^+$, $K^+$, $Li^+$ or $NH_4^+$ cations. Where thicker coatings of electrodeposited polymers are desired, that is 5 to 30 microns, it is preferred to use carboxyl-containing olefin polymer salts having organic monovalent cations such as organic amines which contain one or more hydrophilic groups. Particularly preferred cations of this group are those derived from piperazine, morpholine, ethylene diamine, and mono-, di-, and tri-ethanolamine.

This invention can be practiced in batch or continuous operation. While atmospheric pressure is preferred for economic reasons, subatmospheric pressures can also be employed, if desired.

Among the myriad applications to which this electrodeposition process can be put are protective coatings for structural or decorative electrically conducting articles. Such articles can be coated before or even after shaping since even the most intricately formed and mechanically inaccessible sections of an article can be evenly coated if accessible to the aqueous interpolymer salt.

In this regard, the coating of cans by this process is particularly useful.

Another advantage in using these electrodeposited polymers for coatings lies in the fact that they can be printed on directly without a primer or surface treatment by virtue of the chemical nature of the deposited polymer. This property provides an ideal can coating both internally and externally. The interpolymer coatings formed by this process being flexible permit shaping of articles after coating of forms or sheet stock as well.

A further ramification of this invention involves the use of electrodeposited polymer as an adhesive in the preparation of laminates. In essence, the adherends are first coated with a layer of electrodeposited polymer and then bonded together at elevated temperatures and under moderate pressure. It is not necessary to first electrocoat every adherend in the laminated structure. Thus, for example, to use the making of a sandwich as an analogy, a single adherend can be coated on both sides by electrodeposition and then used to bond two outer adherends, to it by the application of heat and mild pressure, for example, up to about 150° C. at pressures up to about 50 p.s.i.g.

The use of other well-known techniques can also be employed with adherends coated by the present invention, such as extrusion molding, injection molding, vacuum molding, powder coating, electrostatic spraying, fluidized bed coating and the like. Thus, for example, a wire can be prime coated with electrodeposited interpolymer and then provided with a polyethylene outer covering by any of these above-enumerated techniques.

The electrodeposited interpolymers of this invention adhere surprisingly well to polyethylene. Previously it had usually been necessary in order to get a good bond between polyethylene and another adherend, such as aluminum, to heat the polyethylene to such high temperatures that carbonyl formation and degradation of the polyethylene occurred with a corresponding loss of physical properties and formation of color, odor and the like.

Other applications to which the claimed electrodeposition process can be put include:

(a) Protective coatings for cans, paper and for metal articles subject to abrasion and corrosion during shipping;

(b) Wire insulation for electromagnets and transformer windings and the like;

(c) Coatings on foils of regenerated viscose and cellulosic products for making electrolytic capacitors and magnetic and sound tapes, and coatings on aluminum foils for condenser applications;

(d) Paper pulp additive;

(e) Fabrication of stain resistant shop laboratory and work clothing and non-woven fabrics;

(f) Binder or coatings for graphite, aluminum powder pigments and the like;

(g) Filling pinholes and imperfections in heat sealable protective foils such as cigarette wrapping and tobacco pouches;

(h) Protecting tarnishable metals such as copper;

(i) Treating textiles for fabricating waterproof fabrics;

(j) Prime coating electrical wire for facile application of additional insulating covering;

(k) Composite cans, e.g., from aluminum-paper-aluminum laminates;

(l) Sterilizable food containers, e.g., from aluminum polyethylene-aluminum laminates; and the like.

A specific advantage of this electrodeposition process over dip-coating is demonstrated in the coating of graphite cloth, metallic screens, porous metals, or grids. With a dip-coating process bridging, filling or clogging of the openings and interstices is a common problem. With the claimed electrodeposition process, this effect does not take place where the distance between the grids is greater than twice the film thickness since coating takes place only on the conductive surfaces.

However, where the desired object is to provide grid supported films or membranes free of any openings, this can be accomplished by electrodepositing a coating having a thickness greater than one-half the distance between grids.

It is surprising and unexpected that continuous polymer coatings of such wide usefulness can be applied rapidly to such a wide variety of substrates by the electrodeposition process of this invention.

Another surprising and unexpected finding was that carboxyl-containing films have unusually high gas permeability characteristics can be prepared by carrying out the electrodeposition of aqueous dispersions of salts of carboxyl-containing olefin polymers described supra with a permeable membrane interposed between the anode and the said dispersion. Thus for example using a sheet or tube of cellophane (regenerated cellulose) as the membrane a film of carboxyl-containing olefin is deposited not on the anode but on the side of the cellophane membrane facing the cathode. This deposited polymer film when dried has been found to have a much greater gas permeability than an equally thick film of carboxyl-containing olefin polymer prepared by solution casting or compression molding. This discovery is not limited to the use of cellophane membranes. Thus for example sausage casing, collagen films, and other protein films as well as various synthetic polymer films permeable to inorganic ions can be used as well.

Referring now to FIGURE I, 10 is a horizontal, rigid, electrically insulating base, such as of glass or plastic-covered wood, on which are successively stacked: a ring of elastomer, 12, forming a vacuum chamber 14 perforated by glass or metal tube, 16, connectable to a vacuum source; randomly placed chips of the same elastomer, 18 to give support to a 5–10 mil thick sintered metal plate, 20, whose pores varied from 3 to 5 microns diameter; a sheet of 7 mil thick common filter paper saturated with distilled water, 22; a sheet of similarly saturated 4 mil thick cellophane, 24; another ring of elastomer, 26, the same size as 22 but unperforated; and a cylinder of glass, 28, open at both ends. With a vertical clamping arrangement, not shown, the assembly is held together with sufficient vertical force to render the volume above the cellophane a leak-proof vessel which is filled to the level indicated by line 30 with an emulsion of carboxyl containing α-olefin salt. A circular aluminum plate, 32, with an extension tab, 34, is suspended within the emulsion so as not to touch the cellophane surface 24. Upon the application of vacuum to the lower chamber 14 and a direct current between the porous metal plate 20 as anode and the aluminum plate 32 as cathode there is observed an instantaneous passage of current.

In FIGURE II, the deposition surface is the exterior of a length of seamless cellophane tubing, 36, closed at each end by a slightly tapered rubber plug, 38, and secured thereto in a leakproof manner by ceramic or elastomeric retaining rings, 40. The end plugs support, axially within the cellophane tubing, a length of graphite rod, 42, which is 2 cm. less in diameter than the water-swollen diameter of the tubing 36 and to which is provided an electrical contact, 44. The upper end plug also supports a thermometer, not shown, and narrow-diameter insulating tubing, 46 and 48, arranged to allow continuous upward flushing the cell interior with water or an electrolytically conducting solution which may or may not be subsequently recirculated. This anode cell is suspended centrally in a glass vessel, 50, containing a cathode of block tin in the shape of an open-ended cylinder, 52, whose diameter is 2 cm. greater than that of the swollen cellophane tubing 36 and whose height is the same as the vertically exposed cellophane tubing 36 and is connected to electrical contact 54. The inner surface of this cathode (which may be of any metal) is preferably, but not necessarily, loosely but completely covered with a coarse, non-woven cellulosic filter mat, 56, held in place by snap rings of a resilient plastic, 58.

Although not wishing to be limited by any particular theory or explanation, it is believed that the over-all process of electrodeposition of polymers as disclosed in the present invention is probably a combination of three different processes, viz., (1) electrolysis, (2) electrophoresis, and (3) electroendosmosis. But prescinding from the actual mechanism that the electrodeposition follows, modification of the deposited polymer does take place, as evinced by a decrease of up to about 30% in the optical density of the electrodeposited polymer, measured at $5.85\mu$. Other changes that occur as a result of the electrodeposition include insolubility of the electrodeposited polymer in strong alkali, constant boiling toluene-butanol and cyclohexanone. The starting polymer is soluble in these solvents.

Infrared analysis also showed an almost complete absence of salt in the electrodeposited polymer by the extensive diminution of the absorption band at about $6.4\mu$. Samples of electrodeposited polymer were obtained for analysis by using as the anode, tin plate from which a film could be removed after the tin surface was amalgamated with mercury. A mercury pool anode, a highly polished chrome plate anode or an aode fabricated from an electrical conductor such as carbon, graphite or platinum admixed with a non-adhering material such as tetrafluoroethylene polymers can also be used to prepare films of electrodeposited polymers of this invention.

Such procedures can also be used on a larger scale where films of the electrodeposited polymer are the desired product rather than coated articles.

Temperature over the range of about 0° C. to about 100° C. is not critical as regards the chemical nature of the electrodeposited polymer. Temperature does, however, have a quantitative effect as to the amount of polymer deposited on an anodic substrate. This effect varies somewhat with each substrate but in general, there is a minimum amount deposited at about 40° C. with greater amounts deposited above or below this temperature. For reasons of convenience and economy, temperatures of about 20° C. to 30° C. are preferred although any temperatures within the freezing point and boiling point of the bath used can be employed.

Electrodeposition time is not critical since the process is inherently self-regulating. Thus, current flows in general until a continuous insulating coating is deposited on the anodic stubstrate. When the resistance of this deposited coating exceeds a certain value the current flow essentially ceases. In most cases this point is reached in a fraction of a second as determined with an oscilloscope-camera combination, the oscilloscope having a dual trace feature which allows the simultaneous recording of curves of voltage vs. time and current vs. time during any one deposition. Highly porous anodic substrates will conduct current for longer periods because of the time required for diffusion to conducting surfaces.

The technique allows an unequivocal estimation of the initial maximum current, of the time for current to decay to essentially zero, of the total coulombs passed and of the duration and magnitude of any voltage fluctuations. The D.C. power consumption can be calculated directly from the dual trace record.

Any available source of direct current can be used in the practice of this invention such as a motor-generator unit, batteries, rectified alternating current and the like. It was found convenient to employ direct current obtained by the full-wave rectification of a variable autotransformer controlled 115 volt alternating current, filtered to low residual ripple by well-known impedance-capacitance arrangements. It is prefered to use a direct current of at least 5 volts D.C. There is no maximum voltage other than that imposed by the heat generated in the salt bath and the efficiency of heat transfer of the system used.

The anodic substrates which can be used in this invention can be metallic or non-metallic as long as the surface is electroconductive. Particularly useful metallic substrates include aluminum, copper, steel, nickel, chromium, mercury and alloys of these as well as tin plate, galvanized screen and the like, as well as metal coated non-conductors such as thin metal coated plastic articles obtained by sputtering, sintering, evaporating, dip coating and other methods well known in the art. Non-metallic conductive substrates including carbon, graphite, graphite cloth and the like, can easily be employed as well as non-conductors coated with non-metallic conducting substrates.

The cathode should, of course, also be electroconductive and its composition is not critical although it preferably should be inert under the reaction conditions used in the electrodeposition process. Several materials which are suitable include lead, stainless steel, carbon, graphite, tin, platinum, rhodium, and the like. The cathode may be used as a simple electrode immersed in the water-salt bath or may be constructed to serve as the cell to contain the bath, or may be in electrical contact with the bath via a salt bridge porous plate combination or an ionically permeable membrane, without literally touching the bath.

For making metal foil laminates with cellulosic or other porous materials, such as asbestos, the porous material is impregnated with a water-polymer salt mixture and held in contact with a cathode on one side and the metal foil as the anode on the other side. Thus, for example, aluminum-paper laminates as well as paper-aluminum-paper and aluminum-paper-aluminum laminates can be prepared.

The concentration of polymer salt in the aqueous electrodeposition bath is not narrowly critical. Preferred ranges of concentration are determined by a combination of variables which includes the substrate being coated, the coating thickness desired, the rate of coating and the applied voltage being used. Thus, for example, with steel a general preference for salt concentration lies in the range of about 10 to 30% solids by weight, although concentrations of 40% and even higher can be used, if desired, as well as lower concentrations.

For aluminum the preferred satl concentration is about 5% to 40% solids by weight at applied voltages from about 5 to 200 volts D.C. although concentrations higher than 40% can also be used, if desired.

For graphite cloth a preferred salt concentration is in the range of about 5 to 20% although concentrations of 40% and more can be used, if desired.

The invention is further described in the examples which follow wherein all parts and percentages are by weight except for the polymer compositions which are given in terms of mole percent.

EXAMPLE 1

Electrodeposition of polymers on metals

The power supply has been described previously. The metal to be coated was cleaned and degreased successively with acetone and methylene chloride, and tare weight determined. The metal was then immersed in the polymer solution and connected to the positive D.C. lead. The polymer solution was charged to a metal container which was connected to the negative lead. The power supply was pre-set to the desired voltage and the switch connecting the cell was then closed. In general, the potential was applied across the cell for one full minute, although separate experiments using oscilloscope-camera technique showed that the coated process was complete in less than one second for most substrates. The resistance of the deposit plus solution in ohms was measured before its removal from the polymer solution by means of a VTVM (vacuum tube volt meter). The sample was washed with a stream of water and dried at 80–120° for 30 minutes. Film thickness was estimated from the weight of the polymer deposited and area covered, the density of the polymer being approximately unity.

The results are shown in Tables I–XVIII. The polymer compositions given in each table are those present in the aqueous salt bath. The size of particles visible with a 835× microscope were recorded for each salt bath solution used in these experiments.

TABLE I.—DEPOSITION OF ETHYLENE (92.0%)-ACRYLIC ACID (4.8%)-SODIUM ACRYLATE (3.2%) INTERPOLYMER ON Al

Particle Size—Agglomerate at 835X—20% Solids Aqueous Solution

| | | | | | | | | |
|---|---|---|---|---|---|---|---|---|
| Applied Voltage (volts) | 25 | 50 | 75 | 100 | 125 | 150 | 200 | 250 |
| Film Thickness($\mu$) | 10.3 | 17.0 | 13.3 | 10.4 | 7.0 | 7.75 | 6.85 | 5.9 |
| Resistance After Coating (ohms) | 2.2K | 6K | 80K | 800K | 800K | 950K | 700K | 500K |

TABLE II.—DEPOSITION OF ETHYLENE (93%)-ACRYLIC ACID (4.2%)-SODIUM ACRYLATE (2.7%) INTERPOLYMER ON Al

Particle Size—Agglomerate at 835X—19% Solids Aqueous Solution

| | | | | | | | | |
|---|---|---|---|---|---|---|---|---|
| Applied Voltage (volts) | 25 | 50 | 75 | 100 | 125 | 150 | 200 | 250 | 300 |
| Film Thickness ($\mu$) | 9.65 | 15.1 | 14.0 | 10.0 | 7.5 | 7.35 | 6.2 | 5.65 | 4.96 |
| Resistance After Coating (ohms) | 4K | 4K | 9.5K | 100K | 100K | 2M | 2M | 2M | 4M |

TABLE III.—DEPOSITION OF ETHYLENE (92%)-ACRYLIC ACID (3.2%)-SODIUM ACRYLATE (4.8%) INTERPOLYMER ON Al

Particle size—Visible Portion 0.48–1.44$\mu$ at 835X—20% Solids Aqueous Solution

| | | | | | | | | |
|---|---|---|---|---|---|---|---|---|
| Applied Voltage (volts) | 25 | 50 | 75 | 100 | 125 | 150 | 200 | 250 |
| Film Thickness ($\mu$) | 4.59 | 4.95 | 3.61 | 3.69 | 2.98 | 2.95 | 3.36 | 3.42 |
| Resistance After Coating (ohms) | 1.5K | 3M | 3.5M | 6.0M | 10M | 10M | 20M | 18M |

TABLE IV.—DEPOSITION OF ETHYLENE (91.6%)-ACRYLIC ACID (2.1%)-SODIUM ACRYLATE (6.2%) INTERPOLYMER ON Al

Particle Size—Not visible at 835X—20% Solids—Aqueous Solution

| | | | | | | | |
|---|---|---|---|---|---|---|---|
| Applied Voltage (volts) | 25 | 50 | 75 | 100 | 125 | 150 | 250 |
| Film Thickness ($\mu$) | 2.03 | 2.05 | 2.20 | 1.85 | 2.53 | 2.37 | 10.7 |
| Resistance After Coating (ohms) | 50K | 150K | 800K | 2M | 6M | 12M | 12M |

TABLE V.—DEPOSITION OF ETHYLENE (91.8%)-ACRYLIC ACID (0.8%)-SODIUM ACRYLATE (7.4%) INTERPOLYMER ON Al

Particle Size—Visible portion 1.5$\mu$ at 835X—20% Solids—Aqueous Solution

| | | | | | | | | |
|---|---|---|---|---|---|---|---|---|
| Applied Voltage (volts) | 25 | 50 | 75 | 100 | 135 | 150 | 200 | 250 |
| Film Thickness($\mu$) | 1.42 | 1.64 | 1.81 | 1.75 | 1.78 | 2.33 | 1.62 | 7.22 |
| Resistance after Coating (ohms) | 30K | 110K | 6.0M | 12M | 12M | 12M | 12M | 12M |

TABLE VI.—DEPOSITION OF ETHYLENE (91.5%)-SODIUM ACRYLATE (8.5%) INTERPOLYMER ON Al

Particle Size—Not visible at 835X—10% Solid Aqueous Solution

| | | | | | | | | |
|---|---|---|---|---|---|---|---|---|
| Applied Voltage (volts) | 25 | 50 | 75 | 100 | 125 | 150 | 200 | 250 |
| Film Thickness ($\mu$) | 0.37 | 1.94 | 1.4 | 2.12 | 3.48 | 3.6 | 3.10 | 1.4 |
| Resistance After Coating (ohms) | 2.6K | 4.0K | 10K | 8.5K | 60K | 60K | 60K | 15K |

TABLE VII.—DEPOSITION OF ETHYLENE (92.2%)-POTASSIUM ACRYLATE (7.8%) INTERPOLYMER ON Al

Particle Size—Not Visible at 835X—20% Solids Aqueous Solution

| | | | | | | | |
|---|---|---|---|---|---|---|---|
| Applied Voltage (volts) | 25 | 50 | 75 | 100 | 125 | 150 | 200 |
| Film Thickness ($\mu$) | 2.85 | 1.97 | 2.47 | 2.52 | 2.42 | 2.15 | 1.95 |
| Resistance After Coating (ohms) | 26K | 100K | 100K | 1000M | 1000M | 1000M | 1000M |

TABLE VIII.—DEPOSITION OF ETHYLENE (84.3%)-ACRYLIC ACID (2.7%)-LITHIUM ACRYLATE (12.9%) INTERPOLYMER ON Al

Particle Size—Not Visible at 835X—20% Solids Aqueous Solution

| | | | | | | | | |
|---|---|---|---|---|---|---|---|---|
| Applied Voltage (volts) | 25 | 50 | 75 | 100 | 125 | 150 | 200 | 250 |
| Film Thickness ($\mu$) | 1.57 | 1.54 | 1.52 | 1.74 | 2.31 | 2.56 | 1.75 | 1.71 |
| Resistance After Coating (ohms) | 12K | 30K | 120K | 150K | 340K | 500K | 1000M | 1000 |

TABLE IX.—DEPOSITION OF ETHYLENE (92%)—ACRYLIC ACID (4.8%)—SODIUM ACRYLATE (3.2%) INTERPOLYMER ON Cu

Particle Size—Agglomerate at 835X—20% Solids Aqueous Solution

| Applied Voltage (volts) | 250 | 275 | 300 |
|---|---|---|---|
| Film Thickness ($\mu$) | 11.8 | 10.1 | 12.0 |

TABLE X.—DEPOSITION OF ETHYLENE (92%)—ACRYLIC ACID (3.2%)—SODIUM ACRYLATE (4.8%) INTERPOLYMER ON Cu

Particle Size—Visible Portion (835X) 0.48–1.44$\mu$ at 835X—20% Solids Aqueous Solution

| Applied Voltage (volts) | 275 | 300 |
|---|---|---|
| Film Thickness ($\mu$) | 7.51 | 7.46 |
| Resistance After Coating (ohms) | 4K | 200K |

TABLE XI.—DEPOSITION OF ETHYLENE (91.6%)—ACRYLIC ACID (2.1%)—SODIUM ACRYLATE (6.2%) INTERPOLYMER ON Cu

Particle Size—Not Visible at 835X—20% Solids Aqueous Solution

| Applied Voltage (volts) | 150 | 175 | 200 | 225 | 250 | 275 | 300 |
|---|---|---|---|---|---|---|---|
| Film Thickness ($\mu$) | 5.78 | 5.34 | 4.57 | 5.08 | 5.32 | 4.49 | 5.45 |
| Resistance After Coating | 600K | 700K | 1M | 500K | 700K | 700K | 10M |

TABLE XII.—DEPOSITION OF ETHYLENE (91.8%)—ACRYLIC ACID (0.8%)—SODIUM ACRYLATE (7.4%) INTERPOLYMER ON Cu

Particle Size—Small percentage visible at 835X—1.5$\mu$—20% Solids Aqueous Solution

| Applied Voltage (volts) | 125 | 150 | 175 | 200 | 225 | 250 | 275 | 300 |
|---|---|---|---|---|---|---|---|---|
| Film Thickness ($\mu$) | 6.64 | 6.29 | 5.42 | 4.65 | 3.99 | 3.96 | 4.49 | 5.45 |
| Resistance After Coating | 1M | 2M | 20M | 1KM | 1KM | 1KM | 1KM | 1KM |

TABLE XIII.—DEPOSITION OF ETHYLENE (92.2%)—SODIUM ACRYLATE (7.8%) INTERPOLYMER ON Cu

Particle Size—Not Visible at 835X—10% Solids Aqueous Solution

| Applied Voltage (volts) | 225 | 250 | 275 | 300 |
|---|---|---|---|---|
| Film Thickness ($\mu$) | 4.92 | 6.49 | 7.05 | 6.71 |
| Resistance After Coating (ohms) | 22M | 22M | 22M | 22M |

TABLE XIV.—DEPOSITION OF ETHYLENE (91.5%)—POTASSIUM ACRYLATE (8.5%) INTERPOLYMER ON Cu

Particle Size—Not visible at 835X—20% Solids Aqueous Solution

| Applied Voltage (volts) | 200 | 225 | 250 | 275 | 300 |
|---|---|---|---|---|---|
| Film Thickness ($\mu$) | 5.21 | 4.61 | 4.89 | 5.85 | 5.16 |
| Resistance After Coating | 21M | 18M | 18M | 1KM | 1KM |

TABLE XV.—DEPOSITION OF ETHYLENE (84.3%)-ACRYLIC ACID (2.7%)-LITHIUM ACRYLATE (12.9%) INTERPOLYMER ON Cu

Particle Size Not Visible at 835X—20% Soilds Aqueous Solution

| Applied Voltage (volts) | 100 | 125 | 150 | 175 | 200 | 225 | 250 | 300 |
|---|---|---|---|---|---|---|---|---|
| Film Thickness ($\mu$) | 6.15 | 5.09 | 7.10 | 4.71 | 4.32 | 6.45 | 6.25 | 6.91 |
| Resistance After Coating | 22M | 22M | 23M | 23M | 23M | 22M | 24M | 20M |

TABLE XVI.—DEPOSITION OF ETHYLENE (91.8%)-ACRYLIC ACID (0.8%)-SODIUM ACRYLATE (7.4%) INTERPOLYMER

20% Solids Aqueous Solution

| | Film Thickness ($\mu$) | | |
|---|---|---|---|
| | Tin | Steel | Ni |
| Applied Voltage (volts): | | | |
| 10 | ª11.6 | | 2.9 |
| 25 | 5.7 | 5.05 | 1.1 |
| 50 | 6.4 | 3.44 | 0.71 |
| 75 | 4.32 | 3.65 | |
| 100 | 4.36 | 3.41 | 1.78 |
| 125 | 4.72 | 3.73 | |
| 150 | 4.36 | 4.96 | 3.17 |
| 260 | ª5.70 | | |

ª Average of 3 runs.

TABLE XVII.—DEPOSITION OF ETHYLENE (91.8%)-ACRYLIC ACID (0.8%)-SODIUM ACRYLATE (7.4%) INTERPOLYMER ON STEEL

30% Solids Aqueous Solution

| Applied Voltage | 25 | 50 | 75 | 100 | 125 | 150 |
|---|---|---|---|---|---|---|
| Film Thickness ($\mu$) | 2.73 | 2.32 | 1.99 | 2.51 | 3.24 | 4.6 |

TABLE XVIII.—DEPOSITION OF ETHYLENE (91.8%)-ACRYLIC ACID (0.8%)-SODIUM ACRYLATE (7.4%) INTERPOLYMER ON STEEL

10% Solids Aqueous Solution

| Applied Voltage | 10 | 25 | 50 | 75 | 100 | 125 | 150 |
|---|---|---|---|---|---|---|---|
| Film Thickness ($\mu$) | 6.3 | 3.66 | 2.78 | 2.81 | 3.06 | 3.0 | 3.54 |

EXAMPLE 2

Quantitative current measurements

Since the process being dealt with is often complete in a fraction of a second the initial peak current could not be measured on an ordinary ammeter. The conditions thus demanded the use of the oscilloscope-camera combination which enabled the electrical variations during these short-lived depositions to be successfully recorded, by employing a dual-trace oscilloscope. This allowed the simultaneous recording of the curves voltage vs. time and current vs. time during any deposition. The technique allowed an unequivocal estimation of the initial maximum current, of the time for current to decay to essentially zero, of the total coulombs passed and of the duration and magnitude of any voltage fluctuations. If desired, the D.C. power consumption could be calculated directly from the dual-trace record.

A Polaroid camera was used in the oscilloscope camera combination. Even without enlargement, the Polaroid prints were conveniently integrable by direct tracing with a planimeter to yield reproducible values for the total coulomb passage during the deposition.

A metal sheet or foil sample, about 1 x 3 inches, was washed with organic solvents and water in amount and sequence sufficient to insure chemical cleanliness, dried in a circulating air oven for ½ hour at 80–125° C., weighed to the nearest 0.1 mg., suspended from a clamp attached to the positive lead of the power supply circuit described above and immersed to a depth of about 2½ inches, centrally positioned in about 200 ml. of a 20% solids aqueous solution contained in a stainless steel or tin plate beaker insulated from the surrounding apparatus and connected to the negative power supply lead.

The focus and intensity of both oscilloscope spots and the coordinate grid were adjusted as appropriate for the Polaroid film employed, an appropriate horizontal sweep rate was selected, and the desired voltage across the cell set by adjusting the variable autotransformer to provide the correct reading of the voltmeter, and, while directly viewing the screen, any necessary fine adjustments to bring the voltage trace spot to its correct vertical displacement and the current trace spot to its vertical zero were made. The oscilloscope was then set to trigger its sweep at any detectable + or − deviation from these values, and while still directly viewing the screen through the light-excluding viewing port of the Dumont Type 302 camera, the shutter was opened, the deposition cell energized by closing the electrodeposition cell circuit. For recording slower reactions, single sweeps could be manually triggered at selected intervals up to many minutes apart.

The sample was removed, washed in a vigorous stream of distilled water and dried in a circulating air oven at 80–125° C for ½ hour. The Polaroid print was developed, removed and fixed.

The dried sample was weighed and its gain in mgs. recorded. The linear dimensions of the visibly coated area were measured to the nearest 0.01 cm. and the area calculated as the total for the two exposed sides. Milligrams of deposit per square centimeter were calculated directly from these values and the film thickness in microns, based on the approximation of a density of 1 for the deposited interpolymer product, was obtained by dividing the value of mg./cm.$^2$ by 10.

The initial peak current in amperes was estimated directly from the photographic print, as was the time for the decay of the current to effectively zero. The total coulombs passed were calculated by planimeter measurement of the area under the recorded current-time recess.

The data collected are shown in Table XIX for various anodic materials using as the interpolymer salt a 91.88/0.8/7.4 mole percent ethylene/acrylic acid/sodium acrylate interpolymer.

sample of cloth used in this work was uniform to within ±3% of this uncoated weight.

A series of runs was made at various voltages, voltage application time and interpolymer salt concentration. The effects of these variables on the amount of an ethylene (91.8%)/acrylic acid (0.8%)/sodium acrylate (7.4%) interpolymer deposited on the graphite cloth are presented in Table XX.

TABLE XX.—DEPOSITION ON GRAPHITE CLOTH

| Run No. | Interpolymer Salt[a] in Resin Bath | Voltage | Minutes Voltage Applied | Resin Deposited Per Gm. of Cloth |
|---|---|---|---|---|
| 41 | 20 | 5 | 4 | .135 |
| 42 | 20 | 15 | 1 | .128 |
| 43 | 20 | 31 | 1 | .177 |
| 44 | 8 | 50 | 4 | .448 |
| 45 | 20 | 60 | 1 | .205 |
| 46 | 20 | 60 | 4 | .214 |
| 47 | 8 | 70 | ¼ | .246 |
| 48 | 8 | 70 | 1 | .291 |
| 49 | 8 | 70 | 5 | .391 |
| 50 | 20 | 80 | 1 | .148 |
| 51 | 20 | 100 | 1 | .173 |

[a] 91.8% ethylene/0.8% acrylic acid/7.4% sodium acrylate.

TABLE XIX

| Anodic Material and Run Number | Coated Area (cm.$^2$) | Weight Gain (mg.) | Voltage | Initial Current (amps) | Initial Current Density (amp/cm.$^2$) | Initial Current Density (amp/ft.$^2$) | Time to Zero (sec.) | Total Coulombs | Film Thickness | Coulombs per mg. |
|---|---|---|---|---|---|---|---|---|---|---|
| Steel: | | | | | | | | | | |
| 1 | 28.60 | 11.6 | 25 | 4.3 | .150 | 139 | 1.4 | 2.62 | 4.1 | .226 |
| 2 | 26.90 | 8.6 | 40 | 7.2 | .268 | 249 | .8 | 2.00 | 3.2 | .233 |
| 3 | 27.78 | 8.9 | 60 | | | | | | | .172 |
| 4 | 28.18 | 9.0 | 80 | 14.0 | .498 | 463 | .4 | 1.67 | 3.2 | .185 |
| 5 | 27.20 | 8.2 | 80 | 17.0 | .626 | 481 | .3 | 1.57 | 3.0 | .191 |
| 6 | 29.56 | 9.1 | 80 | 16.0 | .540 | 502 | .3 | 1.67 | 3.1 | .184 |
| 7 | 28.64 | 8.3 | 80 | 16.5 | .597 | 554 | .2 | 1.40 | 2.9 | .169 |
| 8 | 28.42 | 13.6 | 80 | 17.0 | .597 | 554 | .2 | 1.61 | 4.8 | .119 |
| 9 | 30.53 | 8.4 | 100 | 20 | .650 | 604 | .2 | 1.49 | 2.8 | .178 |
| 10 | 29.55 | 10.7 | 125 | 25 | .846 | 786 | .2 | 1.39 | 3.6 | .130 |
| Copper: | | | | | | | | | | |
| 11 | 24.12 | 20.4 | 75 | 14.9 | .62 | 576 | .9 | 4.10 | 8.1 | .201 |
| 12 | 26.78 | 17.2 | 100 | 22.5 | .84 | 780 | .8 | 3.45 | 6.4 | .200 |
| 13 | 25.70 | 17.5 | 100 | 21.5 | .84 | 780 | .8 | 3.31 | 6.8 | .189 |
| 14 | 26.88 | 16.7 | 125 | 29.0 | 1.08 | 1,002 | .5 | 3.03 | 6.2 | .181 |
| 15 | 27.80 | 17.2 | 125 | 31.0 | 1.12 | 1,040 | .5 | 3.45 | 6.2 | .200 |
| 16 | 32.50 | 25.8 | 150 | 38.0 | 1.17 | 1,088 | .6 | 4.51 | 7.9 | .175 |
| 17 | 32.26 | 26.1 | 150 | 38.0 | 1.18 | 1,095 | .6 | 4.75 | 8.1 | .182 |
| 18 | 33.28 | 29.1 | 150 | 38.0 | 1.17 | 1,088 | .6 | 5.18 | 8.7 | .178 |
| Aluminum: | | | | | | | | | | |
| 19 | 22.80 | 3.6 | 40 | 5.8 | .254 | 236 | .7 | .95 | 1.6 | .265 |
| 20 | 21.93 | 5.2 | 40 | 6.3 | .287 | 267 | .6 | .95 | 2.4 | .182 |
| 21 | 23.10 | 2.2 | 40 | 5.9 | .255 | 237 | .7 | .81 | .9 | .368 |
| 22 | 22.60 | 1.1 | 60 | 9.2 | .407 | 378 | .5 | .85 | .6 | .613 |
| 23 | 25.72 | 4.6 | 60 | 10.9 | .424 | 394 | .5 | .95 | 1.8 | .207 |
| 24 | 25.62 | 2.6 | 80 | 15.6 | .570 | 529 | .34 | .87 | 1.1 | .333 |
| 25 | 24.28 | 1.5 | 80 | 14.5 | .597 | 554 | .30 | .80 | .6 | .535 |
| 26 | 24.00 | 4.0 | 100 | 16.0 | .666 | 618 | .11 | .57 | 1.7 | .343 |
| 27 | 22.95 | 4.7 | 100 | 15.5 | .676 | 628 | .19 | .68 | 2.1 | .333 |
| 28 | 19.28 | 3.6 | 100 | 12.5 | .649 | 602 | .13 | .43 | 1.9 | .230 |
| 29 | 26.42 | 5.5 | 125 | 22.0 | .833 | 774 | .11 | .71 | 2.1 | .131 |
| 30 | 22.10 | 6.2 | 125 | 18.5 | .835 | 776 | .11 | .55 | 2.8 | .089 |
| 31 | 25.90 | 4.4 | 150 | 24.5 | .947 | 878 | .12 | .62 | 1.7 | .141 |
| 32 | 23.37 | 5.4 | 150 | 22.0 | .942 | 874 | .11 | .67 | 2.3 | .124 |
| Tinplate: | | | | | | | | | | |
| 33 | 71.4 | 26.6 | 100 | 35 | .50 | 465 | .5 | 3.10 | 3.7 | .117 |
| 34 | 90.6 | 34.3 | 150 | 40 | (.5) | (465) | .5 | 3.34 | 3.8 | .098 |
| 35 | | 33.6 | 150 | 40 | | | .7 | 4.20 | | .125 |
| Graphite Cloth: | | | | | | | | | | |
| 36 | | 184.40 | 30 | 4.5 | | | 3 mins. | 20.25 | | .110 |
| 37 | | 146.5 | 30 | 5.2 | | | 2 mins. | 18.25 | | .125 |
| Carbon Rod: | | | | | | | | | | |
| 38 | 7.99 | 4.4 | 20 | 2.1 | .26 | 244 | 3.0 | .86 | 5.5 | .195 |
| 39 | 8.20 | 6.9 | 50 | 6.0 | .73 | 680 | .5 | 1.00 | 8.4 | .144 |
| 40 | 8.24 | 3.7 | 100 | 12 | 1.5 | 1,400 | .3 | .80 | 4.5 | .220 |

EXAMPLE 3

Deposition on graphite cloth

Samples of about 1″ x 3″ were solvent-washed and dried. A non-conductive clamp (devised from two coated bar magnets) attached to the lower edge allowed the sample to hang flat and to be immersed vertically in the resin bath. The currents observed during deposition decayed to zero far more slowly than for deposition on metal, but did eventually (usually by 5 minutes) become non-detachable on a miliammeter. After deposition the coated portion could be quite roughly handled while washing in running water. After drying, the percentage weight gain was determined by weighing a rectangular sample cut from the heart of the fully coated area, measuring its linear dimensions, and calculating the weight of an equal uncoated area from the value of 9.0240 gm./cm.$^2$, which was separately determined for a series of randomly cut rectangles of the cloth as received. The

EXAMPLE 4

When ethylene/methacrylic acid interpolymers neutralized with lithium, sodium, potassium or ammonium hydroxide are substituted for the interpolymers described in Examples 1–3, comparable results are obtained.

EXAMPLE 5

The use of electrodeposited interpolymer of this invention as a dielectric component for condensers and the like was demonstrated using a standard cell consisting essentially of interpolymer, electrodeposited on aluminum from an interpolymer containing about 89.6% ethylene, 2.4% acrylic acid and 8.0% sodium acrylate and a mercury electrode. Twelve samples were evaluated for capacitance, dissipation factor, and insulation resistance, two of which were also tested for breakdown voltage. Pertinent data obtained are presented in Table XXI. The capacitance values shown were measured at approximately the same location on each sample and show good uniformity of capacitance and hence thickness for all samples. The size of the standard cell used was such that 1000 picofarads capacitance corresponds to a film thickness of one micron if the dielectric constant is 2.65. The insulation resistance was measured on a conventional Megohmmeter at 10 volts. Breakdown voltage was determined by the use of the Microdot Tester. This instrument measures direct current voltage breakdown in a nondestructive test by virtue of the fact that the current is automatically shut off at breakdown.

The color fringes are used to determine the uniformity of film thickness over the entire substrate surface. Since two or three color fringes are evident on all samples, the film thickness variation lies between about ½ micron and one micron on the basis of about 0.2 micron per color fringe. Approximately 75% of the areas of these samples is uniform to within one color fringe.

TABLE XXI

| Sample No. | C$^a$ (pf.) | D$^b$ (percent) | IR$^c$ (megohms) | BDV$^d$ (v.) | Apparent Color Fringes |
|---|---|---|---|---|---|
| 1 | 837.5 | .39 | 10$^6$ | | 2-3 |
| 2 | 890 | .37 | 10$^6$ | 40–70 | 2 |
| 3 | 857 | .32 | 10$^6$ | | 3 |
| 4 | 844 | .31 | 10$^6$ | | 2 |
| 5 | 837 | .32 | 10$^6$ | 40–75 | 3 |
| 6 | 905 | .32 | 10$^6$ | | 2 |
| 7 | 837 | .30 | 10$^6$ | | 2 |
| 8 | 838 | .33 | 10$^6$ | | 2 |
|   | 834 | .34 |   |   |   |
| 9 | 1,050 | .45 | 10$^6$ | | 3 |
| 10 | 1,065 | .52 | 10$^6$ | | 4 |

All measurements were made at 25° C. Capacitance and dissipation are at 1 kc.
$^a$ Capacitance.
$^b$ Dissipation.
$^c$ Insulation resistance.
$^d$ Breakdown voltage.

EXAMPLE 6

Thick paper of purified fiber (#1 grade filter paper) was saturated with a 20% by weight aqueous solution of interpolymer salt (comprising ethylene 91.8%, sodium acrylate 7.4% and acrylic acid 0.8%) and laid upon aluminum foil which was connected to the positive lead of a D.C. power supply. A 0.50" diameter platen of polished steel, connected to the negative lead of the D.C. power supply was pressed against the resin-saturated paper component of the dual laminate and a voltage of 150 volts was applied during 60 seconds, during which time the current flowing in the circuit fell from an initial momentary surge of greater than 5 amperes to less than 10 milliamperes. After stopping the current, washing the paper-foil combination in running water and oven drying for 30 minutes at 125° C., it was found that such portion of paper as was under the steel platen was firmly bonded to the aluminum, where as areas not in such contact easily delaminated from the foil upon simple mechanical flexion. By sliding a continuous strip of aqueous interpolymer salt impregnated paper together with a contiguous continuous strip of aluminum foil between the above-described electrodes in a closed circuit, bonded strips of paper-aluminum foil can be prepared continuously.

EXAMPLE 7

Containers of paper bonded to aluminum can be fabricated by the convolute or helical winding of paper-aluminum strips prepared as in Example 6 with one modification, vis., the paper strip is wider than the aluminum strip. This provides a lay or overlap paper area impregnated with electrodeposited interpolymer which when pressed firmly in a winding motion on a cylindrical mandrel heated up to about 80° C. to 125° C. bonds the aluminum-paper strips into cylinders. Snap caps positioned in place at both ends provide cylindrical containers, paper on the inside and aluminum on the outside, having excellent vapor barrier properities.

EXAMPLE 8

Copper wire (18 gauge with no surface treatment) was continuously electrocoated on a laboratory scale with insulating interpolymer by continuously drawing the wire over an anode through a vertically held stainless steel cylinder which served as a cathode and a container for a 20% aqueous interpolymer salt solution prepared from an ethylene (91.8%)-acrylic acid (0.8%)-Na acrylate (7.4%) interpolymer and out through a rubber serum stopper or septum which served to plug up the bottom of the container and squeegee off occluded salt bath fluid. The copper wire was moved at a rate of 25 feet per minute at 150 volts and 80 milliamperes. Upon leaving the bath the wire was washed with water and dried for 30 minutes in an 85° C. circulating air oven. It was found that a strongly adhering coating of interpolymer 1.5 microns thick had been deposited on the wire uniformly and that no current flowed when the leads of an ohmmeter were touched to any two points along the coated length.

EXAMPLE 9

In the following tabulated electrodepositions the designated substrate was made the anode of a 100 volt D.C. circuit for 60 seconds while immersed in a 20% by weight aqueous solution of interpolymer salt comprising 91.8% ethylene, 7.4% sodium acrylate and 0.8% acrylic acid. The dependence of the amount of deposit, shown as film thickness in microns for the metallic substrates and as percentage weight increase for the fibrous graphite structure on temperature is evident from the data presented in Table XXII.

TABLE XXII

| | Deposit Thickness on:— | | | Percent Loading on Graphite Cloth |
|---|---|---|---|---|
| | Tinplate | Steel | Aluminum | |
| Temperature, °C.: | | | | |
| 2 | 16.2 | 11.5 | 6.4 | |
| 9 | | | 3.9 | 71 |
| 15 | 11.4 | 6.7 | 2.8 | |
| 20 | | | 2.1 | 53 |
| 28 | 2.4 | 2.4 | 1.3 | 46 |
| 32 | | | | 42 |
| 35 | | | 0.9 | |
| 40 | 1.2 | 1.0 | 0.9 | |
| 45 | | | | 38 |
| 50 | 2.2 | 2.5 | 1.0 | |
| 60 | | | 1.6 | 41 |
| 70 | 7.0 | 5.7 | 2.1 | |
| 75 | | | | 49 |
| 80 | | | 2.7 | |
| 90 | 12.5 | 10.8 | | 55 |

EXAMPLE 10

Several lamination experiments were conducted as shown below:

Aluminum foil samples, 3" x 5", and 1 mil thick were coated by means of electrodeposition with 20% aqueous solution of ethylene (91.8%), acrylic acid (0.8%), sodium acrylate (7.4%) at 100 v. Coatings 1.5 to 2$\mu$ thick were obtained.

Laminates of Al to Al, Al to kraft pape, Al to polyethylene film of the so coated foils were prepared by heating at 140° in a press at about 22 p.s.i. for 4 minutes. The press was then cooled rapidly with running water. Excellent adhering laminates were obtained.

Biaxially oriented polyethylene terephthalate films used as backings surprisingly did not adhere to the coated aluminum foil.

EXAMPLE 11

Porous steel plates of pore size about 5$\mu$ were cut into circular disks having a diameter of approximately 2½". These plates were washed and degreased and their tare weight determined. The plates were then immersed in a 20% aqueous solution of ethylene (91.8%) acrylic acid (0.8%) sodium acrylate (7.4%) and connected as the anode. The container of the polymer solution was connected as the cathode. The electrodeposition was carried out at 75 volts for 1 minute. The electrical resistance as measured in the deposition cell by means of a VTVM increased from 23 ohms to >1K megohms and net weight gain was 0.9–1.01 g.

Examination of the interior of the disk by breaking the disk indicated that the deposition had penetrated the pores of the disk.

EXAMPLE 12

Charcoal granules of 1.0–1.68 mm. were packed in an Alumdum thimble filled with 20% aqueous solution of ethylene (91.8%)-acrylic acid (0.8%)-sodium acrylate (7.4%). A platinum wire was immersed in the charcoal to serve as electrical contact and was connected as the anode. The Alundum thimble was immersed in an aqueous polymer solution of the same composition whose container was connected as the cathode. A D.C. potential was applied until the current decayed from an initial value of 2 amp. to 15 ma. The coated charcoal was then washed with water under pressure and dried at 80° for 3 hours. Removal of the Alundum thimble afforded a rod formed of charcoal granules bonded with the electrodeposited polymer.

Similarly, bonding of iron powder was achieved at 100 v. The container used for the iron powder experiments was a paper cup designed for a Soxhlet extractor.

Finely divided activated charcoal powder was also bonded together by this method to form a rod.

EXAMPLE 13

Bonding of aluminum foil to asbestos paper

A sheet of asbestos saturated with a 20% aqueous solution of ethylene-acrylic acid-sodium acrylate was placed between two sheets of aluminum foil which were not allowed to touch each other, and pressed together under about 10–15 p.s.i. The aluminum foils were connected as anode and cathode, respectively, and D.C. current was passed at 100 v. An initial current of 1.8 amp was obtained which decayed rapidly and reached an asymptotic value of about 300 ma. in less than one minute. The D.C. current was discontinued. The asbestos and the aluminum foil which served as anode were bonded such that they cannot be separated without tearing the asbestos. The sample was washed with distilled water and dried at 80° for ½ hour. The so obtained laminate show strong adhesion between aluminum and asbestos.

The bonding experiments were also carried out at 75, 50 and 25 v. with similar results.

EXAMPLE 14

When the experiments described in Examples 5–13 are repeated but with ethylene-acrylic acid or propylene-acrylic acid interpolymer salts containing lithium, potassium, or ammonium cations instead of sodium similar results are obtained.

EXAMPLE 15

Particles of aluminum, carbon, iron or other electrical conductors can be coated rather than fused together by following the procedure of Example 12 but by applying a D.C. potential unit the current decayed only to about ½ of its initial value. Discrete particles coated with interpolymer can be then obtained by washing with water or by mechanical agitation, such as grinding of the treated particle mass.

The following example demonstrates the fact that the electrodeposition process of the present invention is not broadly applicable to any carboxyl containing polymer chosen at random but requires proper selection of suitable polymers such as those described previously.

EXAMPLE 16–20

To 200 ml. of an aqueous dispersion containing 48.6% by weight of a terpolymer comprising styrene (44.01 mole percent, butadiene (54.4 mole percent), and acrylic acid (1.6 mole percent) was added 1.0 ml. of a 1% by weight solution of potassium hydroxide in water thereby neutralizing 92% of the polymer carboxyl groups. In this bath, used in the electrodeposition procedure described in Example 1, samples of steel were made the anode, in separate experiments at 5, 50, and 100 volts D.C. respectively. Similarly, samples of tin plate and aluminum were treated at 100 volts D.C. In all cases measurable currents of about 0.15 amps were still flowing when the circuit was broken after 2 minutes of electrodeposition. In all cases the washed and dried electrodeposited polymer was a thick cheesy, non-uniform coagulum of no apparent utility as a protective or electrically insulating coating.

EXAMPLES 21–34

A slurry comprising 20 parts of a 90.2/9.8 (mole percent) ethylene/acrylic acid copolymer in finely pulverized form, 230 parts of water, and 3.2 parts of diethanolamine was heated with stirring to 95° C. whereupon the insoluble copolymer dissolved to form an opalescent solution, 50% neutralized which remained mobile and filterable upon cooling. Aluminum strips immersed in this solution were made the anode of either a 100 or 150 volt D.C. circuit for 60 seconds at various deposition temperatures, then washed with water and dried at 80° C. The resulting smooth transparent coatings had thicknesses as summarized in Table XXIII.

TABLE XXIII

| Deposition Temperature, °C.: | Thickness in microns at— | |
|---|---|---|
| | 100 v. | 150 v. |
| 5 | 9.4 | 7.9 |
| 15 | 7.2 | 4.6 |
| 25 | 3.7 | 2.8 |
| 35 | 1.6 | 1.4 |
| 45 | 1.0 | 1.0 |
| 52 | 0.7 | |
| 62 | 0.8 | |
| 72 | 1.8 | |
| 82 | 2.8 | |

EXAMPLES 35–46

Solutions of the 90.2/9.8 (mole percent) ethylene/acrylic acid copolymer containing sufficient diethanolamine to provide for 79%, 95% and 110% (10% excess over theory) neutralization of the carboxyl groups were prepared as in Examples 21–34. The thickness in microns of the coatings of ethylene/acrylic acid coatings on aluminum anodes at 4 temperatures, and 100 volts D.C. after 1 minute were measured. The results are shown in Table XXIV.

TABLE XXIV.—NEUTRALIZATION BY DIETHANOLAMINE

| | Thickness in Microns at Neutralization of— | | |
|---|---|---|---|
| | 79% | 95% | 100% |
| Temperature, °C.: | | | |
| 15 | 2.5 | 1.7 | 1.4 |
| 25 | 1.4 | 0.7 | 0.9 |
| 35 | 0.8 | 0.8 | 0.9 |
| 45 | 1.4 | 1.6 | 1.4 |

EXAMPLES 47–88

Using the procedure described in Examples 21–34 successfully electrodepositable solutions or emulsions were obtained of the 90.2/9.8 (mole percent) ethylene/acrylic acid copolymer neutralized, at levels of 70% or higher, with the following amino compounds: ethanolamine, methyl ethanolamine, triethanolamine, ethylene diamine, N-aminoethyl ethanolamine, hexamethylene diamine, morpholine and piperazine. Table XXV is a summary of depositions from such dispersions at a variety of conditions; the data are illustrative of the range of coating thickness that can be controlled by proper choice of either or all of the variables: amount and identity of neutralizing agent, temperature, and voltage.

TABLE XXV

| Amino Compound | Percent Neutralization of Polymer | Substrate | Voltage | Temperature, °C. | Deposit thickness (Microns) |
|---|---|---|---|---|---|
| Monoethanolamine | 91 | Aluminum | 150 | 5 | 0.8 |
| Do | 83 | do | 150 | 5 | 1.9 |
| Do | 76 | do | 150 | 5 | 2.6 |
| Do | 70 | do | 150 | 5 | 3.3 |
| Ethylene diamine | 100 | Steel | 150 | 15 | 27.9 |
| Do | 100 | Tinplate | 150 | 15 | 21.6 |
| Do | 100 | Aluminum | 150 | 2 | 56.2 |
| Do | 100 | do | 150 | 15 | 20.6 |
| Do | 100 | do | 150 | 25 | 10.9 |
| Do | 100 | do | 150 | 35 | 7.4 |
| Do | 100 | do | 150 | 45 | 5.4 |
| Do | 100 | do | 150 | 55 | 4.6 |
| Do | 100 | do | 150 | 65 | 4.0 |
| N-aminoethyl ethanolamine | 88 | do | 25 | 20 | 3.5 |
| Do | 88 | do | 50 | 20 | 18.0 |
| Do | 88 | do | 75 | 20 | 25.5 |
| Do | 88 | do | 100 | 20 | 28.8 |
| Do | 88 | do | 125 | 20 | 19.1 |
| Do | 88 | do | 150 | 20 | 14.3 |
| Do | 88 | Steel | 150 | 30 | 12.2 |
| Do | 88 | do | 150 | 40 | 8.1 |
| Do | 88 | do | 150 | 50 | 6.9 |
| Morpholine | 100 | Aluminum | 50 | 30 | 0.3 |
| Do | 100 | do | 150 | 30 | 2.8 |
| Do | 100 | do | 200 | 30 | 9.0 |
| Do | 100 | do | 250 | 30 | 23.0 |
| Do | 100 | do | 300 | 30 | 24.6 |
| Do | 70 | do | 100 | 10 | 9.8 |
| Do | 70 | do | 100 | 20 | 2.6 |
| Do | 70 | do | 100 | 30 | 2.1 |
| Do | 70 | do | 100 | 40 | 0.9 |
| Do | 70 | do | 100 | 50 | 0.8 |
| Do | 70 | do | 100 | 60 | 0.9 |
| Piperazine | 75 | Steel | 150 | 10 | 31.0 |
| Do | 75 | do | 150 | 20 | 22.2 |
| Do | 75 | do | 150 | 30 | 14.5 |
| Do | 75 | do | 150 | 40 | 7.0 |
| Do | 75 | do | 150 | 50 | 4.6 |
| Do | 75 | do | 150 | 60 | 3.3 |
| Hexamethylene diamine | 100 | do | 150 | 5 | 13.8 |
| Do | 100 | do | 150 | 25 | 9.2 |
| Do | 100 | do | 150 | 45 | 8.6 |

EXAMPLES 89–96

Forty grams of an ethylene/acrylic copolymer (90.2/9.8 (mole percent) 40 g. provided 122 milliequivalents of —COOH) in the form of ⅛″ extruded pellets was stirred moderately in 600 ml. of water containing piperazine (4.0 g.) and conc. NH$_4$OH (8.4 ml.) while heating to reflux under a stream of nitrogen with all exit gases being led into a scrubbing system which allowed titration of evolved NH$_3$ with standardized acid. A thin, almost clear solution was formed at 95° C. and ammonia evolution became rapid when reflux was reached. Ninety-seven percent of the charged NH$_3$ was recovered in 1½ hours, during which time the stirred system became progressively more opaque and emulsion-like. Two hundred and eight mls. of water were then allowed to distill from the system during 2 hours of additional heating. The resulting emulsion readily passed through a fibrous filter of nominal 2–7 micron pore size and showed no tendency to coagulate upon storage. Aluminum strips were made the anode of a 100 v. D.C. circuit for 30 seconds while immersed in this emulsion, and were dried at 80° C. after being removed and washed in a stream of water. Clear, smooth coatings were obtained, demonstrating the following dependence of thickness on deposition temperature as shown in Table XXVI.

TABLE XXVI

| Temperature, °C. | Thickness in microns |
|---|---|
| 10 | 27.0 |
| 20 | 19.4 |
| 30 | 7.9 |
| 40 | 3.9 |
| 50 | 2.0 |
| 60 | 1.6 |
| 70 | 1.5 |
| 80 | 2.9 |

EXAMPLES 97–103

Fifty (50.0) g. of 90.2/9.8 ethylene/acrylic acid copolymer (152 milliequivalents of —COOH) in the form of ⅛″ extruded pellets was heated with moderate stirring in 475 ml. of water to which 20 ml. of concentrated NH$_4$OH (300 meq. NH$_3$) and 5.6 ml. of 2.04 N NaOH solution (11.5 meq. Na$^+$=7.5% of the polymer

—COOH)

had been added. At 90° C. the insoluble pellets disintegrated to a thin, hazy solution and ammonia evolution began. After four hours at reflux, the evolution of ammonia, as measured by acid titration of a scrubbing solution arranged to trap all evolved gases, was complete and the nearly clear solution had gradually become an opaque white emulsion which remained stable upon cooling and which could be stored indefinitely without change. Examination by phase-contrast microscope showed it to be a uniform dispersion of particles all less than one micron in diameter. In a similar manner terpolymer emulsions were prepared from this copolymer at neutralization levels of 15%, 30% and 45% (above which level dispersion can be effected by direct treatment with aqueous alkali) and from a 93.3/6.7 ethylene/acrylic acid copolymer at 60%, 80% and 95% neutralization levels. The effects of degree of neutralization upon electrodeposition behavior are shown by the data of Table XXVII obtained for depositions on aluminum at constant voltage for 30 seconds at various temperatures. This table also includes the significant data, obtained during a variety of depositions from the emulsions of these examples, showing that while the electrical efficiency (amp. sec. to form a given weight of deposit) is (except near 100% neutralization) a linear function of the degree of neutralization, the electrochemical consumption for any deposition is essentially one Faraday per Na acrylate unit.

TABLE XXVII

| Ethylene/Acrylic Acid Mole Ratio | Thickness in Microns of Electrodeposit on Aluminum | | | | | | | | | |
|---|---|---|---|---|---|---|---|---|---|---|
|  | 90.2/9.8 | | | | | | | 93.3/6.7 | | |
| Percent Neutralized | 7.5 | 15 | 30 | 45 | 60 | 77 | 95 | 60 | 80 | 95 |
| Temperature, °C.: | | | | | | | | | | |
| 10 | 110.0 | 56.1 | 24.0 | 15.8 | 10.5 | 4.0 | 1.4 | 17.3 | 12.1 | 6.7 |
| 20 | 155.0 | 54.5 | 22.3 | 7.1 | 6.0 | 2.1 | 3.0 | 11.1 | 4.4 | 2.7 |
| 30 | 150.0 | 36.0 | 7.5 | 3.3 | 2.7 | 1.3 | 2.1 | 4.4 | 2.4 | 1.4 |
| 40 | 105.0 | 13.0 | 3.6 | 1.3 | 1.3 | 0.9 | 1.7 | 1.6 | .9 | .6 |
| 50 | 22.5 | 2.7 | 1.1 | .8 | .9 | 1.0 | 1.7 | .6 | .4 | .5 |
| 60 | 3.5 | 1.3 | 1.3 | 1.1 | 1.0 | 1.4 | 2.2 | .6 | .6 | .6 |
| Coulombs/g.[a] | 22 | 44 | 90 | 140 |  | 200 | 800 | 140 | | |
| F/mole Na+COO- | .99 | .99 | 1.01 | 1.05 |  | .88 | 2.86 | 1.08 | | |

[a] For depositions at 30° C. on steel, aluminum, Zn, nickel, tin, lead and carbon; value independent of nature of substrate.

EXAMPLE 104

Using the apparatus described in FIGURE I filled to the level, 30, with an emulsion consisting of 90 parts of water and 10 parts of a 90.2/5.4/4.4 ethylene/acrylic acid/sodium acrylate terpolymer, upon the application of vacuum to the chamber, 14, and 150 volts D.C. between the porous metal plate, 20, as anode and the aluminum plate, 34, as cathode an instantaneous passage of 1.4 amps./sq. decimeter of exposed cellophane was observed which current decayed within 180 seconds to 0.07 amps./sq. decimeter at which time the circuit was opened and the emulsion decanted. A white, opaque circular disc of electro-deposit was found to have been formed, which could be lifted free of the cellophane, washed free of adhering emulsion by dipping in clear water, and dried while spread flat on a nonsticking surface (such as that of a fluorinated-polymer slab) at 80° C. for one-half hour, by which treatment it was converted to a clear, strong, flexible film whose infrared spectrum was essentially that of a 90.2/9.8 ethylene/acrylic acid copolymer. This film displayed the relatively high porosity to air at room temperature of $13 \times 10^7$ cc. mils/100 sq. in. 24 hr. atm. while simultaneously exhibiting the relatively low water vapor transmission of 83 gm. mils/100 sq. in. 24 hr. atm. Such a unique combination of permeabilities would have utility for: the transparent moisture-proof wrapping of substances needing air for their preservation (red meat); the containing of moist systems which might suddenly develop internal gas concentrations (battery systems); or as a membrane allowing gas escape and transfer in a submerged milieu (a so-called "artificial gill").

EXAMPLE 105

Using the apparatus delineated in FIGURE II with city tap water at 45° C. flowing in the inner chamber, a 90.2/8.3/1.5 ethylene/acrylic acid/sodium acrylate emulsion at 9% solids content, heated to 45° C., was placed in the outer chamber to a depth sufficient to cover the cellophane, was allowed a few moments to saturate the coarse filter cloth, and 100 v. D.C. was impressed across the cell from graphite as anode to tin as cathode. Current initially passed at a peak rate of 1.25 amp./sq. dm. of cellophane surface, then dropped to effectively zero by 90 seconds. The circuit was disconnected, the anode chamber was lifted from the bath, the cloudy film of electrodeposit was slit vertically once and peeled off as a coherent rectangularly shaped film which, after washing in water, dried at 80° C. in one-half hour to a clear, tough film 1 mil thick which exhibited the following high permeabilities to gases:

Dry $CO_2$ _____ $10.3 \times 10^7$ cc. mils/100 in.$^2$ 24 hr. atm.
Dry air _____ $9.6 \times 10^7$ cc. mils/100 in.$^2$ 24 hr. atm.
Dry $O_2$ _____ $8.6 \times 10^7$ cc. mils/100 in.$^2$ 24 hr. atm.
Wet $CO_2$ _____ $8.6 \times 10^7$ cc. mils/100 in.$^2$ 24 hr. atm.

Although the invention has been described in its preferred forms with a certain degree of particularity, it is understood that the present disclosure has been made only by way of example, and that numerous changes can be made without departing from the spirit and scope of the invention.

What is claimed is:

1. Method of coating a substrate with an olefin polymer which comprises electrodepositing, at a potential of at least 5 volts D.C., said olefin polymer onto a conductive anodic substrate from an aqueous bath containing an admixture of water and a carboxyl containing α-olefin polymer salt having monovalent cations, the α-olefin content of said polymer salt being at least 50 mole percent of the total polymer salt.

2. Method claimed in claim 1 wherein the α-olefin is ethylene.

3. Method claimed in claim 1 wherein the carboxyl containing α-olefin polymer salt contains up to 25 mole percent of the polymer salt of an α,β-ethylenically unsaturated carboxylic acid having up to 2 carboxylic acid groups.

4. Method claimed in claim 3 wherein the ethylenically unsaturated carboxylic acid is acrylic acid, the starting interpolymer having a melt index of about 0.01 dg./min. to 100 dg./min. and the acrylic acid inorganic salt moieties comprise about 10 to 25 mole percent the total polymer salt.

5. The method claimed in claim 4 wherein 7.5 to 95 weight percent of the acrylic acid in the carboxyl containing α-olefin polymer salt is neutralized.

6. The method claimed in claim 5 wherein the thickness of the substrate coating is about 1 to 155 microns.

7. The method claimed in claim 1 wherein the monovalent cations are Na+ cations.

8. The method claimed in claim 1 wherein the monovalent cations are K+ cations.

9. The method claimed in claim 1 wherein the monovalent cations are Li+ cations.

10. The method claimed in claim 1 wherein the monovalent cations are represented by the formula:

wherein each of $R_1$, $R_2$ and $R_3$ is selected from the group consisting of hydrogen and substituted and unsubstituted organic radicals containing up to 10 carbon atoms, wherein said substituents are selected from the group consisting of hydroxyl, amino, imino and cyclic ether groups with the proviso that two of the organic radicals can be combined to form a heterocyclic compound.

11. Method claimed in claim 1 wherein the anodic substrate is a ferrous metal.

12. Method claimed in claim 1 wherein the anodic substrate is a non-ferrous metal.

13. Method claimed in claim 1 wherein the anodic substrate is non-metallic.

14. Method claimed in claim 11 wherein the non-metallic anodic substrate is graphite cloth.

15. Method claimed in claim 1 wherein the anode is in particulate form supported in a non-conducting porous cup.

16. Method of preparing laminates which comprises the steps of:
(a) providing a direct current source of at least 5 volts D.C.;

(b) electrically contacting a metallic substrate with the positive electrode of the direct current source;

(c) electrically contacting a porous substrate, impregnated with a mixture of water and a salt of an interpolymer of (1) an α-olefin having the general formula:

$$RCH=CH_2$$

wherein R is selected from the group consisting of hydrogen and alkyl radicals having up to 10 carbon atoms, the olefin content of said interpolymer being at least 50 mole percent of the total interpolymer, and (2) an α,β-ethylenically unsaturated carboxylic acid interpolymerized therein, said unsaturated carboxylic acid constituting up to about 25 mole percent of the total interpolymer, with the negative electrode of the direct current source;

(d) physically contacting said metallic substrate with said porous substrate; and (e) applying a voltage of at least 5 volts D.C. for a length of time sufficient to effect the deposition of a continuous, insulating coating of a modified α-olefin/olefinically unsaturated carboxylic acid interpolymer, said interpolymer containing less carboxyl anions than the α-olefin/ethylenically unsaturated carboxylic acid interpolymer salt present in the water-salt mixture.

17. Method claimed in claim 16 wherein the metallic substrate is aluminum, the porous substrate is paper and the interpolymer salt is an ethylene/acrylic acid/sodium acrylate interpolymer.

18. Method claimed in claim 16 wherein up to about 150 volts D.C. were applied for about 60 seconds.

19. Method claimed in claim 16 wherein the physically contacted metallic and porous substrates are moved past the positive and negative electrodes respectively in a continuous operation.

20. Article coated with an olefin interpolymer electrodeposited, at a potential of at least 5 volts D.C., onto said article from an aqueous bath containing an admixture of water and a carboxylic acid containing α-olefin interpolymer salt having monovalent cations, the α-olefin content of said interpolymer salt being at least 50 mole percent of the total interpolymer salt.

21. Electrodeposited film of a carboxyl-containing interpolymer of (1) an α-olefin having the general formula:

$$RCH=CH_2$$

wherein R is selected from the group consisting of hydrogen and alkyl radicals having up to 10 carbon atoms, the olefin content of said interpolymer being at least 50 mole percent of the total interpolymer and (2) an α,β-ethylenically unsaturated carboxylic acid having up to 2 carboxylic acid groups interpolymerized therein, said unsaturated carboxylic acid constituting up to about 25 mole percent of the total interpolymer.

22. Electrodeposited film claimed in claim 21 wherein said film is deposited directly on an anode.

23. Electrodeposited film claimed in claim 21 wherein said film is deposited on a permeable membrane physically separating the electrodes.

24. Method of fusing electroconductive particles into an integral mass which comprises:

(a) immersing the electroconductive particles physically contacting one another in a bath comprising a mixture of water and a salt of an interpolymer of:
(1) an α-olefin having the general formula $$RCH=CH_2$$

wherein R is selected from the group consisting of hydrogen and alkyl radicals having up to 10 carbon atoms, the olefin content of said interpolymer being at least 50 mole percent of the total interpolymer and (2) an α,β-ethylenically unsaturated carboxylic acid interploymerized therein having up to 2 carboxylic acid groups, said unsaturated carboxylic acid constituting up to about 25 mole percent of the total interpolymer;

(b) connecting a cathode in electrical contact with said water-salt bath;

(c) connecting an anode in electrical contact with said electroconductive particles;

(d) connecting a direct current source in an electrical circiut containing the anode, cathode and water-salt bath; and (e) applying a voltage of at least 5 volts D.C. for a length of time sufficient to effect fusing of the electroconductive particles into an integral mass.

25. Method claimed in claim 24 wherein the electroconductive particles are carbon.

26. Method claimed in claim 24 wherein the electroconductive particles are iron.

27. Method claimed in claim 24 wherein the electroconductive particles are supported in a porous container.

References Cited

UNITED STATES PATENTS

| | | | |
|---|---|---|---|
| 2,478,322 | 8/1949 | Robinson et al. | 204—181 |
| 2,530,366 | 11/1950 | Gray | 204—181 |
| 3,230,162 | 1/1966 | Gilchrist | 204—181 |
| 3,332,866 | 7/1967 | Wszolek | 204—181 |
| 3,378,477 | 4/1968 | Gentles | 204—181 |

HOWARD S. WILLIAMS, *Primary Examiner.*

E. ZAGARELLA, JR., *Assistant Examiner.*

PO-1050
(5/69)

UNITED STATES PATENT OFFICE
CERTIFICATE OF CORRECTION

Patent No. U.S. 3,445,362      Dated May 20, 1969

Inventor(s) Sui-Wu Chow, et al.

It is certified that error appears in the above-identified patent and that said Letters Patent are hereby corrected as shown below:

Column 4, lines 33-37 and Claim 10, the formula should appear as follows:

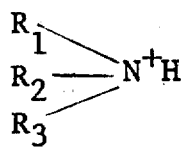

SIGNED AND
SEALED
SEP 30 1969

(SEAL)
Attest:

Edward M. Fletcher, Jr.
Attesting Officer

WILLIAM E. SCHUYLER, JR.
Commissioner of Patents